3,658,783
MONOAZO DYESTUFFS CONTAINING A TRI-
AZINE IN THE COUPLING COMPONENT
Walter Knobloch, Cologne-Buchheim, and Edgar Siegel, Leverkusen-Steinbuechel, Germany, assignors to Farbenfabriken Bayer Aktiengesellschaft, Leverkusen, Germany
No Drawing. Filed May 8, 1969, Ser. No. 823,177
Claims priority, application Germany, May 15, 1968,
P 17 69 366.2
Int. Cl. C09b 62/08
U.S. Cl. 260—153     2 Claims

ABSTRACT OF THE DISCLOSURE

Water-insoluble monoazo dyestuffs free from sulphonic acid groups and having the formula

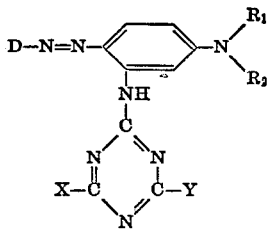

in which:

D denotes an aromatic-carbocyclic or aromatic-heterocyclic radical; $R_1$ and $R_2$ represent identical or different alkyl radicals which may be substituted; X stands for halogen, for an alkoxy group which may be further substituted, or for

where $R_3$ and $R_4$ are H or identical or different alkyl radicals which may be substituted; and Y denotes an optionally substituted alkoxy group or the radical

suitable for dyeing and printing synthetic fibers wherein the dyeings are characterized by very good fastness to light and wet processing.

---

The object of the present invention comprises new valuable water-insoluble monoazo dyestuffs which are free from sulphonic acid groups and correspond to the general formula

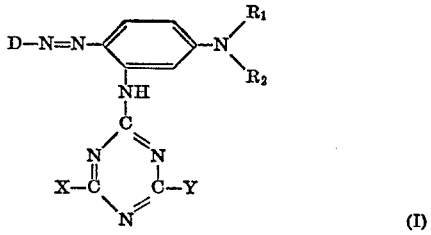
(I)

in which D denotes an aromatic-carbocyclic or aromatic-heterocyclic radical; $R_1$ and $R_2$ represent identical or different, optionally substituted alkyl radicals, preferably those with 1–4 carbon atoms in the alkyl chain; X stands for halogen, especially chlorine, for an alkoxy group which may be further substituted or for the radical

where $R_3$ and $R_4$ represent hydrogen or identical or different alkyl radicals which may be substituted; and Y denotes an optionally substituted alkoxy group or the radical

where $R_3$ and $R_4$ have the same meaning as above, as well as their production and use.

Preferred dyestuffs are those of the formula

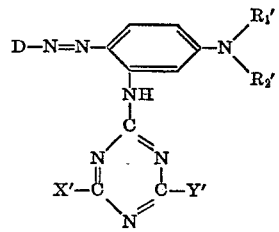
(Ia)

in which D has the same meaning as above; $R_1'$ and $R_2'$ stand for alkyl radicals with 1–4 carbon atoms in the alkyl or alkylene radical, which may be substituted by hydroxy, cyano, acyloxy, alkoxy, oxyalkoxy, alkoxycarbonyloxy or carbalkoxy groups; $X'$ represents chlorine, an alkoxy group with 1–4 carbon atoms or a radical

where $R_3'$ and $R_4'$ denote hydrogen or alkyl groups with 1–4 carbon atoms, which may be substituted by hydroxy or alkoxy groups; and $Y'$ stands for an alkoxy group with 1–4 carbon atoms or for the radical

The new dyestuffs are obtained by diazotising diazo components $D—NH_2$(II) which are free from sulphonic acid groups and combining the product with coupling components of the general formula

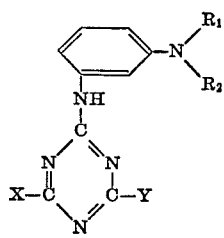
(III)

in which $R_1$, $R_2$, X and Y have the same meaning as above.

The coupling components to be used according to the present process are obtained, for example, by reacting s-trichloro-triazine in known manner successively with lower alkanols, N,N-dialkyl-m-phenylene-diamines of the general formula

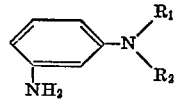
(IV)

in which $R_1$ and $R_2$ have the same meaning as above, and with amines of the formula

V
in which $R_3$ and $R_4$ have the same meaning as above.
Examples of coupling components (III) which are suitable for the production of the new dyestuffs are the following:
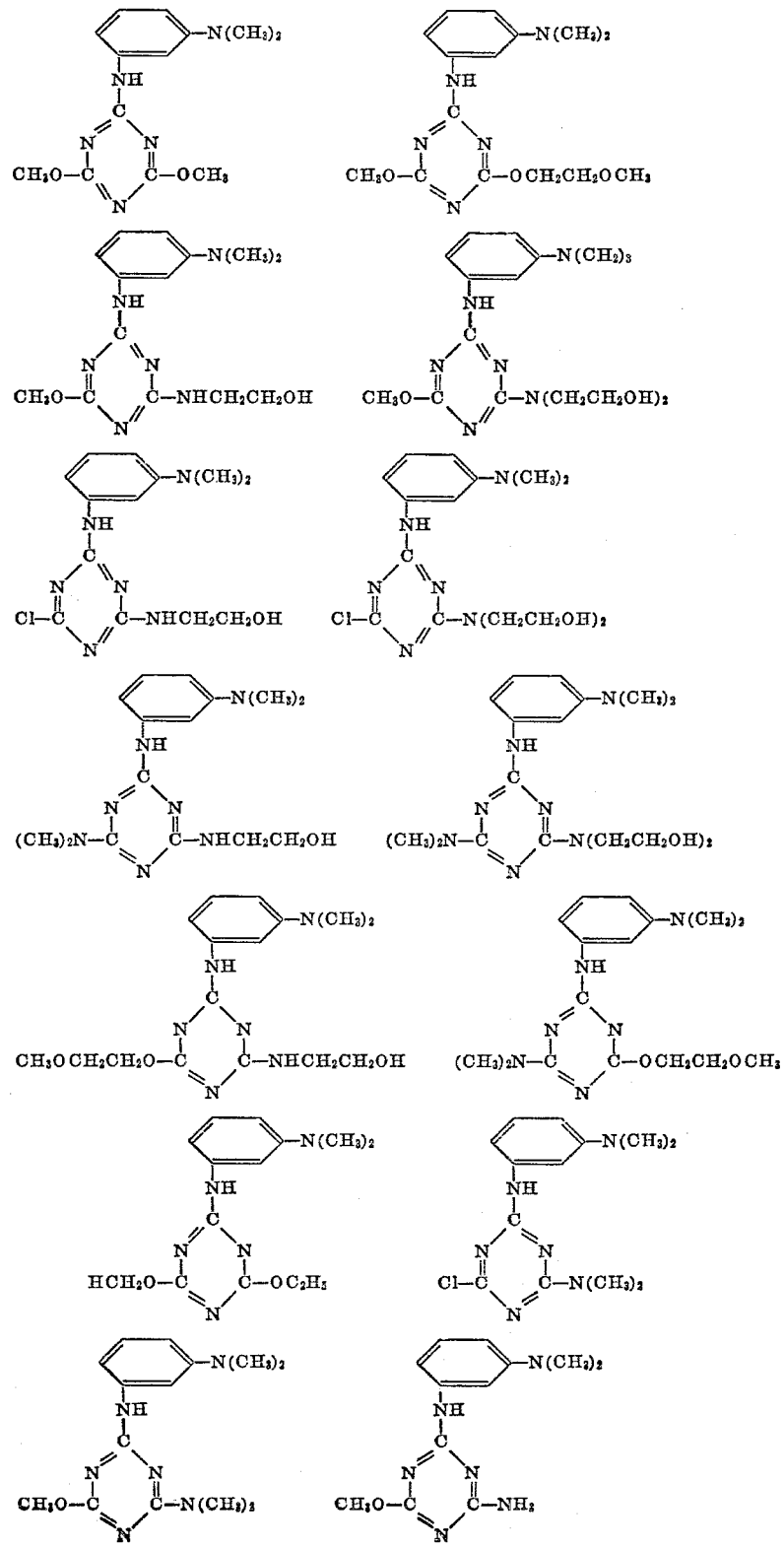

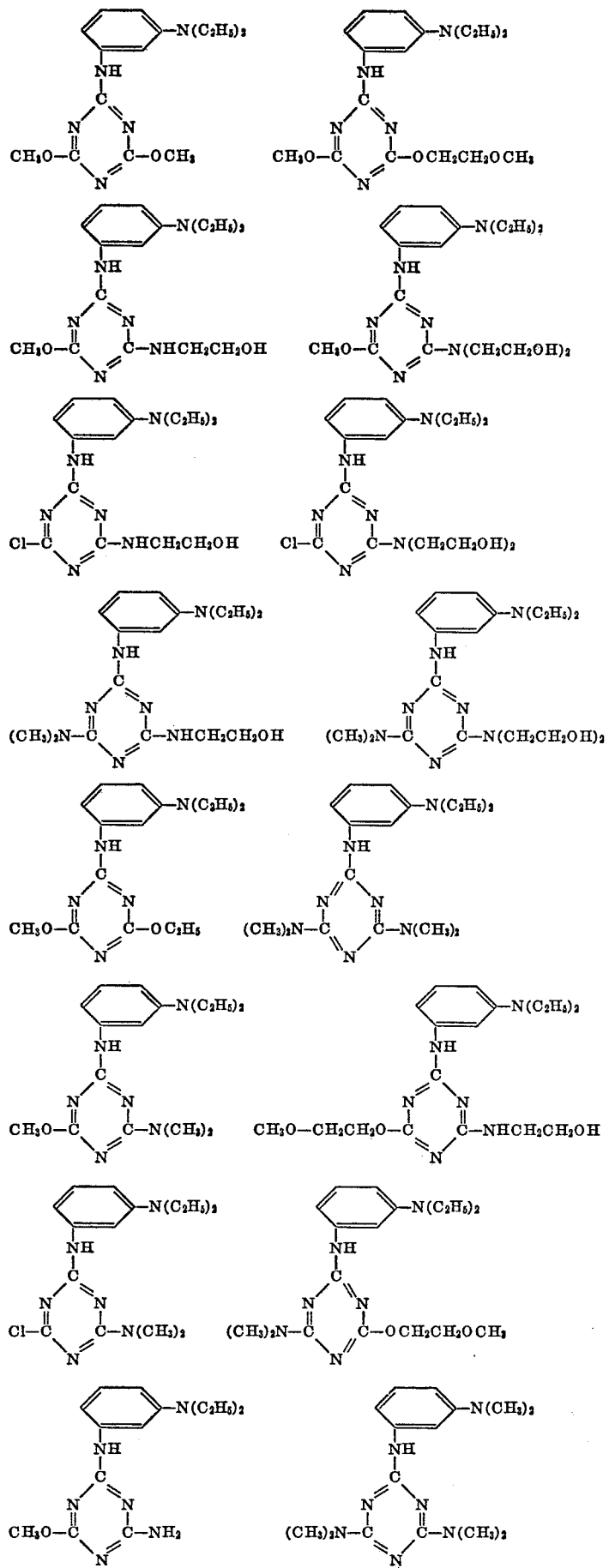

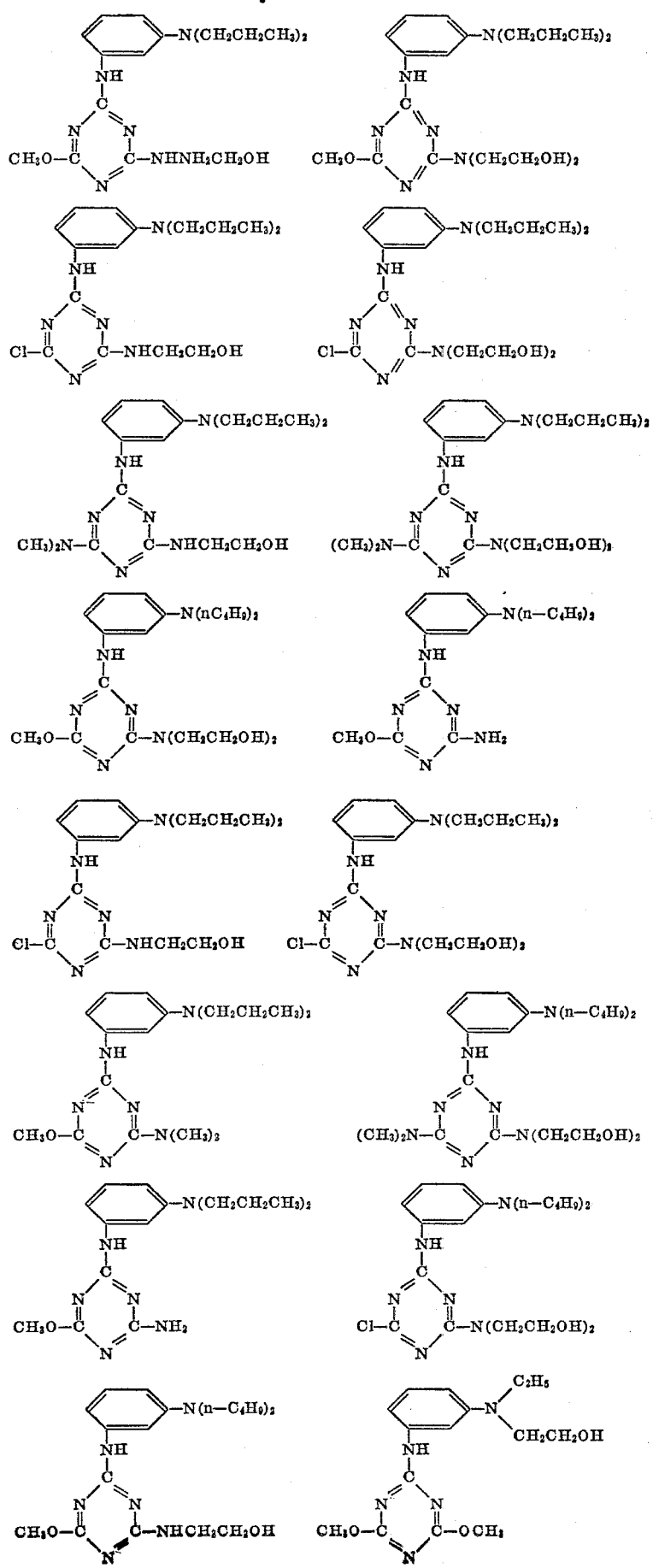

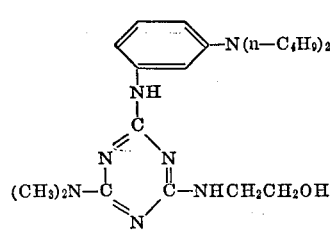
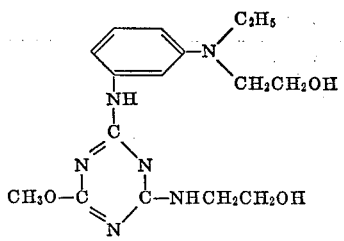
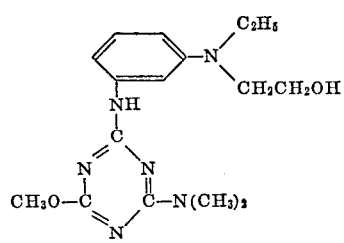
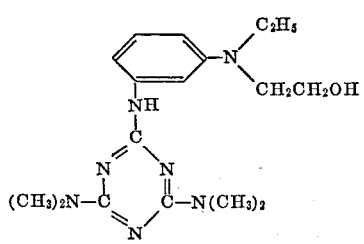
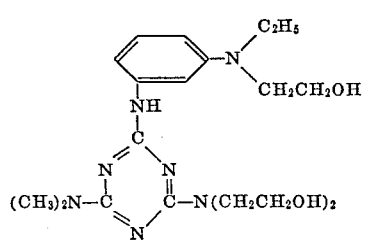
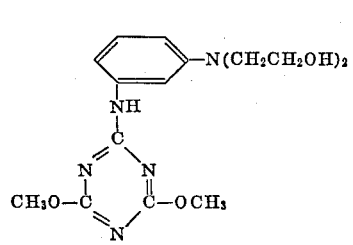
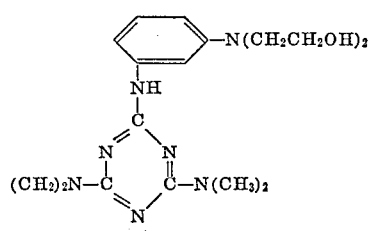
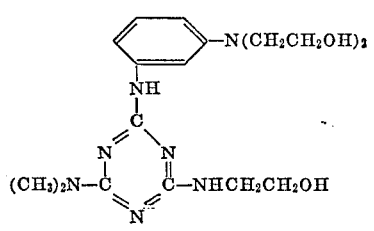
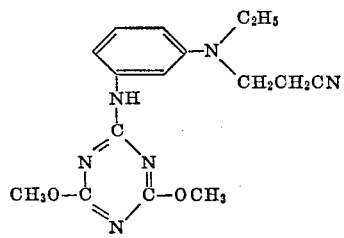
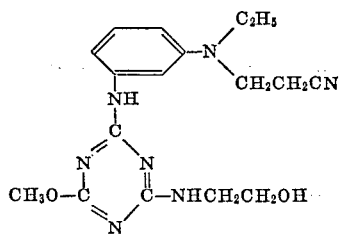
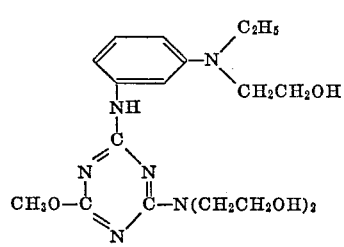
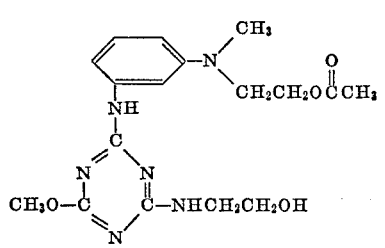
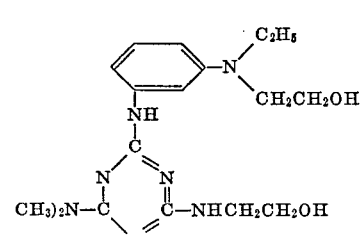
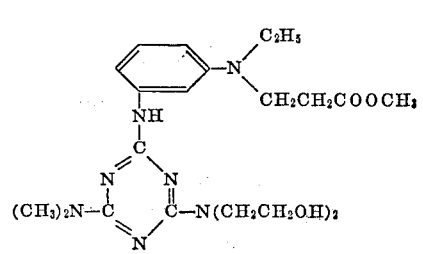

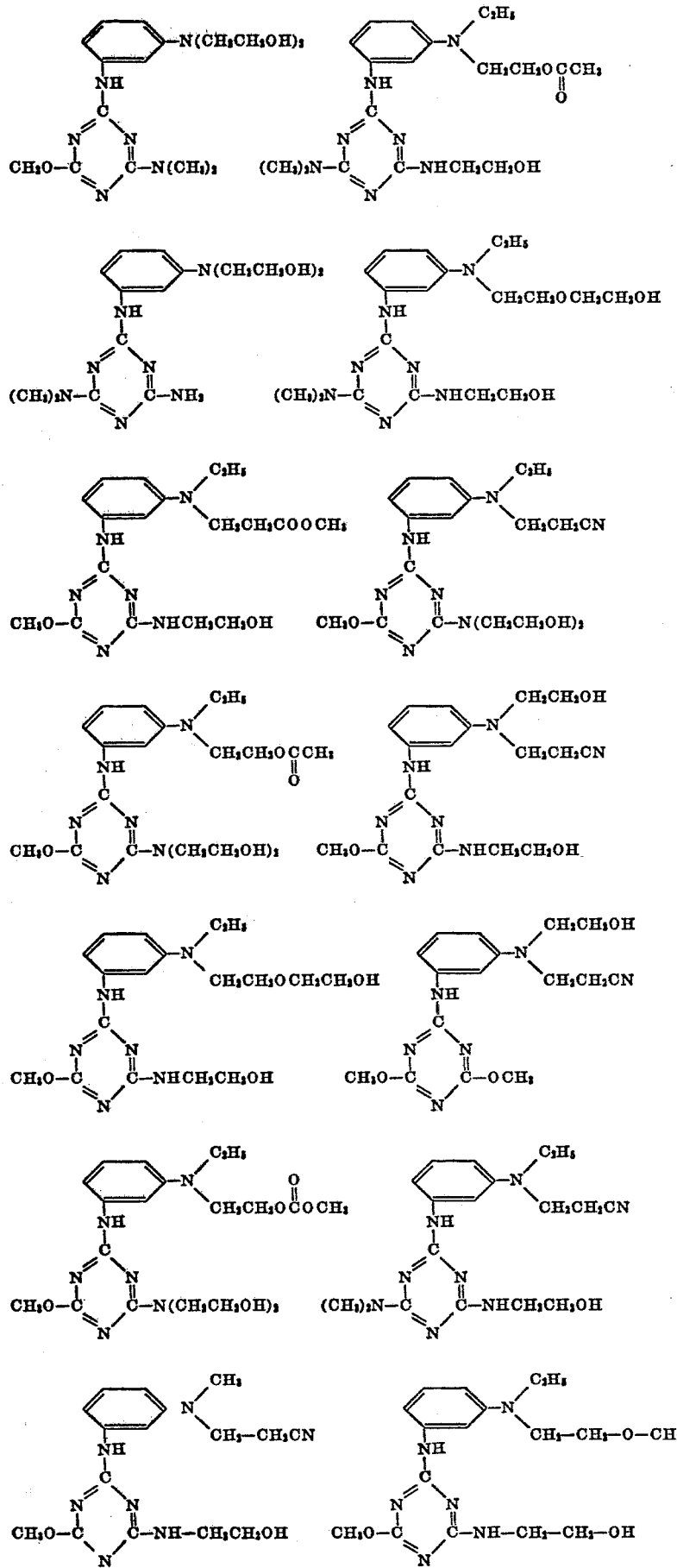

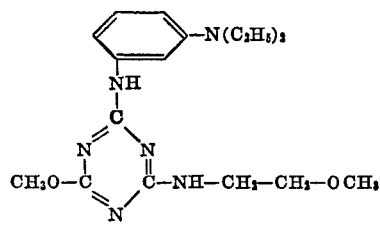
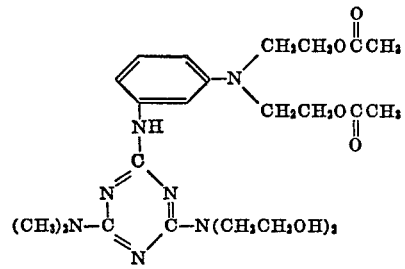

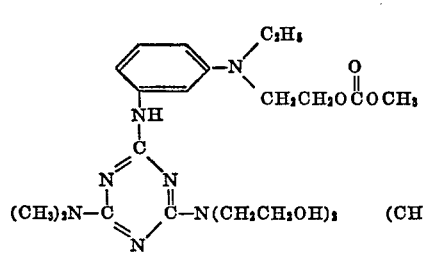
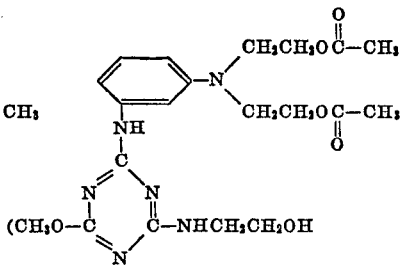

Suitable diazo components D—NH₂ are, for example:
aniline 2-chloroaniline,
3-chloroaniline,
4-chloroaniline,
2-methylaniline,
3-methylaniline,
4-methylaniline,
2-ethylaniline,
3-ethylaniline,
4-ethylaniline,
2-nitroaniline,
3-nitroaniline,
4-nitroaniline,
2-chloro-4-nitroaniline,
2-chloro-3-nitroaniline,
2-chloro-4,6-dinitroaniline,
2-nitro-4-chloroaniline,
2-nitro-3-chloroaniline,
2,4-dinitroaniline,
2,6-dichloro-4-nitroaniline,
2-cyano-4-nitroaniline,
2,4-dicyananiline,
2,3-dichloroaniline,
2,4-dichloroaniline,
3,5-dichloroaniline,
3,4-dichloroaniline,
2,4,5-trichloroaniline,
pentachloroaniline,
2-chloro-4-methylaniline,
2-methyl-4-chloroaniline,
4-aminobenzoic acid,
3-chloro-4-aminobenzoic acid,
3-chloro-4-aminobenzoic acid ethyl ester,
4-aminobenzoic acid ethyl ester,
3-nitro-4-aminobenzoic acid,
3-nitro-4-aminobenzoic acid ethyl ester,
2-aminobenzoic acid,
3-chloro-4-cyananiline,
3-chloro-6-cyananiline,
4-aminobenzoic acid amide,
4-aminobenzoic acid dimethylamide,
4-acetylamino-2-chloroaniline,
4-acetylamino-2,5-dichloroaniline,
4-methylsulphonylaniline,
2-trifluoromethyl-4-methylsulphonylaniline,
2-ethylsulphonyl-4-nitroaniline,
2-chloro-4-ethylsulphonylaniline,
4-methoxyaniline,
3-methoxyaniline,
2-nitro-4-methoxyaniline,
2-methoxy-4-nitroaniline,
2-amino-thiazole-(1,3),
2-amino-5-nitro-thiazole-(1,3),
2-aminobenzothiazole-(1,3),
2-amino-6-ethoxybenzothiazole-(1,3),
5-amino-3-phenyl-thiadiazole-(1,2,4),
3-aminopyridine,
8-aminoquinoline,
3-amino-indazole,
3-amino-triazole-(1,2,4).

The coupling of the starting components to form the new dyestuffs is carried out in known manner, for example, in a neutral or weakly to strongly acidic aqueous medium.

The water-insoluble new dyestuffs of the general Formula I obtained according to the present process are suitable for the dyeing and printing of fully synthetic fibres, especially those consisting of polyamides, cellulose esters and polyesters, especially polyterephthalic acid glycol esters. The dyeings on synthetic polyamide fibres are particularly valuable and are characterised by a very good fastness to light and wet processing.

The parts given in the following examples are parts by weight.

EXAMPLE 1

5.7 parts p-chloroaniline are stirred with 12 parts of concentrated hydrochloric acid at room temperature for 30 minutes, 50 parts of water are then added and diazotisation is performed at 0–5° C. with a solution of 3 parts sodium nitrite in 30 parts of water. After filtering, this diazonium salt solution is added to a solution of 14.7 parts of the coupling component of the formula

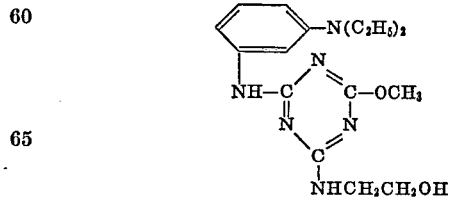

in 50 parts of 10% hydrochloric acid at 0–5° C., and the coupling which sets in immedately is completed after some time by the addition of sodium acetate. When the coupling is terminated, the resultant dyestuff is filtered off, washed with water until salt-free, and dried. 19.6 parts of a yellow-orange powder are thus obtained. This dyestuff of the formula

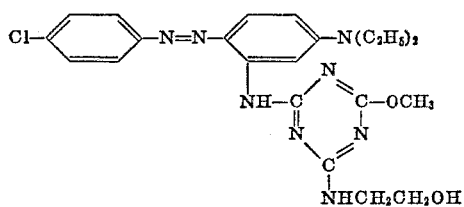

dyes fibres and fabrics of polyamides in very strongly yellowish orange shades of good general fastness properties.

EXAMPLE 2

7.05 parts 2,4-dichloroaniline are stirred with 12 parts of concentrated hydrochloric acid at room temperature for 30 minutes, 50 parts of water are then added, and diazotisation is performed at 0–5° C. with a solution of 3 parts sodium nitrite in 30 parts of water. After filtering, this diazonium salt solution is added to a solution of 16.35 parts of the coupling component of the formula

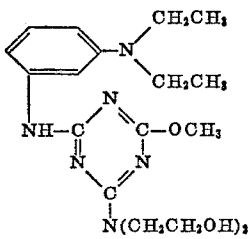

in 50 parts of 10% hydrochloric acid at 0–5° C., and the coupling which sets in immediately is completed after some time by the addition of sodium acetate. When the coupling is terminated, the resultant dyestuff is filtered off, washed with water until salt-free, and dried. 23.3 parts of an orange powder are thus obtained. This dyestuff of the formula

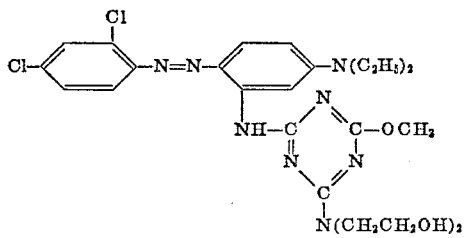

dyes fibres and fabrics of polyamides in yellowish orange shades of very good general fastness properties.

EXAMPLE 3

7.05 parts 2,4-dichloroaniline are diazotised as described in Example 2, and this diazonium salt solution is combined with a solution of 15 parts of the coupling component of the formula

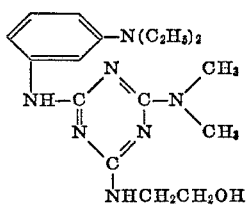

in the manner described in Example 2. The dyestuff obtained after filtering, washing and drying corresponds to the formula

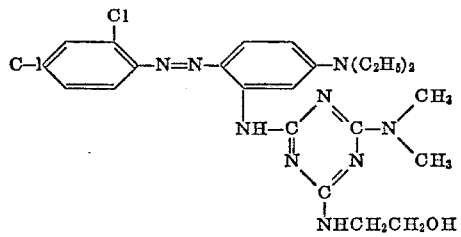

and dyes fibres and fabrics of polyamides in yellowish orange shades of very good general fastness properties. Yield 21.8 parts.

EXAMPLE 4

7.2 parts 4-aminobenzoic acid ethyl ester are stirred at 0–5° C. with a mixture of 50 parts of water and 12 parts of concentrated hydrochloric acid and diazotised at 0–5° C. with a solution of 3 parts sodium nitrite in 30 parts of water. After filtering, this diazonium salt solution is added to a solution of 14.7 parts of the coupling component of the formula

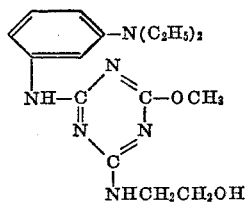

in 50 parts of 10% hydrochloric acid at 0–5° C., and the coupling which sets in immediately is completed after some time by the addition of sodium acetate. When the coupling is terminated, the resultant dyestuff is filtered off, washed with water until salt-free, and dried. 21 parts of an orange powder are thus obtained. This dyestuff of the formula

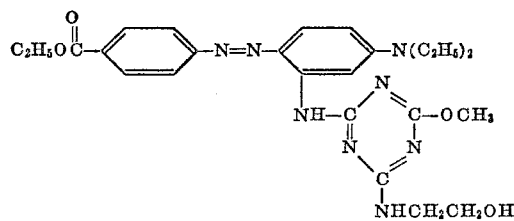

dyes fibers and fabrics of polyamides in reddish orange shades of very good general fastness properties.

Table 1 contains further very valuable dyestuffs which are obtained by combining the diazonium salt solution of Example 4 in the manner there described with the coupling components indicated below in Table 1.

TABLE 1

| Example | Coupling component | Shade on polyamide |
|---|---|---|
| 5 | ![structure] | Orange. |
| 6 | ![structure] | Reddish orange. |

TABLE 1—Continued

| Example | Coupling component | Shade on polyamide |
|---|---|---|
| 7 | 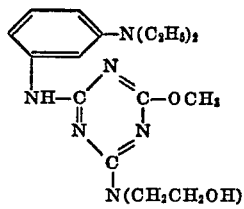 | Reddish orange. |

EXAMPLE 8

9.9 parts 4-acetamino-2,5-dichloroaniline are stirred at 0–5° C. with a mixture of 50 parts of water and 12 parts of concentrated hydrochloric acid and diazotised at 0–5° C. with a solution of 3 parts sodium nitrite in 30 parts of water. After filtering, this diazonium salt solution is added to a solution of 16.35 parts of the coupling component of the formula

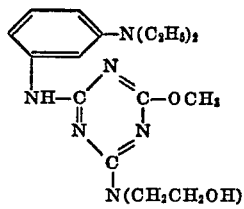

in 50 parts of 10% hydrochloric acid at 0–5° C., and the coupling which sets in immediately is completed after some time by the addition of sodium acetate. The yield of the orange powder obtained after filtering, washing until salt-free and drying amounts to 25.3 parts. This dyestuff of the formula

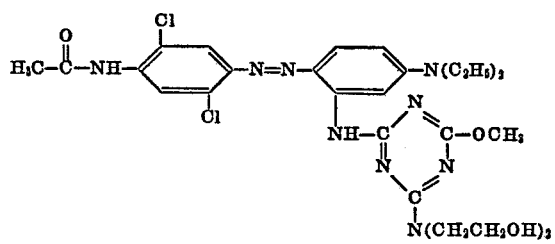

dyes fibres and fabrics of polyamides in reddish orange shades of very good general fastness properties.

EXAMPLE 9

9.6 parts 2,4,5-trichloroaniline are dissolved in 30 parts of glacial acetic acid, the solution is poured into a mixture of 50 parts of water and 12 parts hydrochloric acid and then diazotised at 0–5° C. with a solution of 3 parts sodium nitrite in 30 parts of water. After filtering, this diazonium salt solution is added to a solution of 16.2 parts of the coupling component of the formula

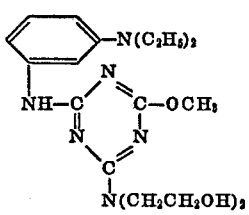

in 50 parts of 10% hydrochloric acid at 0–5° C., and the coupling which sets in immediately is completed after some time by the addition of sodium acetate. The yield of orange powder obtained after filtering, washing until salt-free and drying amounts to 22.8 parts. This dyestuff of the formula

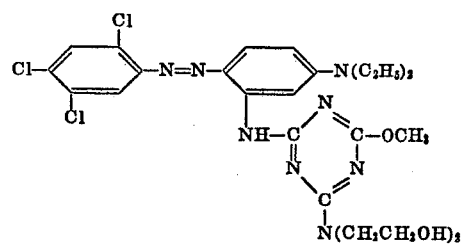

dyes fibres and fabrics of polyamides in orange shades of very good general fastness properties.

EXAMPLE 10

The diazonium salt solution prepared according to Example 9 from 9.6 parts 2,4,5-trichloroaniline is combined in the manner there described with 15 parts of the coupling component of the formula

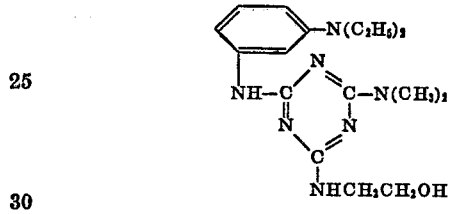

The dyestuff obtained after filtering off, washing until salt-free and drying corresponds to the formula

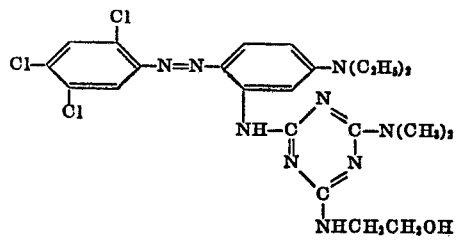

and is an orange powder; the yield amounts to 23.2 parts. The dyestuff dyes fibres and fabrics of polyamides in orange shades of very good general fastness properties.

EXAMPLE 11

8.1 parts 3-phenyl-5-amino-thiadiazole-(1,2,4)-are stirred with 60 parts of 80% phosphoric acid. 13.2 parts nitrosylsulphuric acid are then slowly added dropwise at −5° C. The diazotisation is completed after 4 hours. Any excess of nitrite is destroyed with some urea. 16.2 parts of the coupling component of the formula

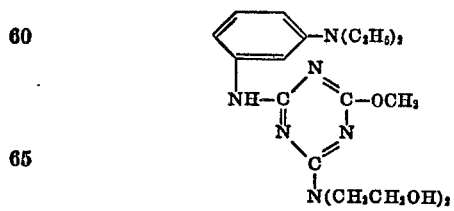

in 50 parts of glacial acetic acid are slowly poured at −5° C. into the above phosphoric acid diazonium salt solution. Stirring is continued for 2 hours, and the mixture is then poured into 3000 parts of ice-water. After stirring for a further 1–2 hours, the product is filtered off with suction, washed until free from salt and acid, and the resultant dyestuff of the formula

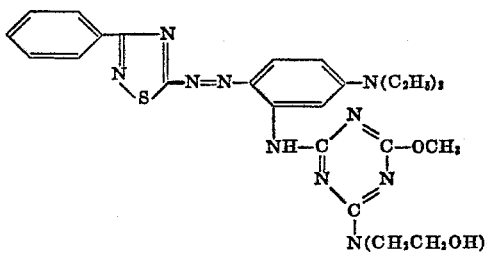

is dried. It is a bluish red powder, the yield amounts to 21 parts. This dyestuff dyes fibres and fabrics of polyamides in bluish red shades of very good general fastness properties.

Table 2 contains further very valuable dyestuffs which are obtained by combining the diazonium salt solution of Example 11 in the manner there described with the coupling components mentioned below in Table 2.

Further valuable azo dyestuffs of the aforesaid type are obtained by combining the diazonium salt solutions of the diazo components stated below with the coupling components stated below.

TABLE 2

| Example | Coupling component | Shade on polyamide |
|---|---|---|
| 12 | (structure with N(C₂H₅)₂, NH-C, C-Cl, NHCH₂CH₂OH) | Bluish red. |
| 13 | (structure with N(C₂H₅)₂, NH-C, C-N(CH₃)₂, NHCH₂CH₂OH) | Bluish red. |
| 14 | (structure with N(C₂H₅)₂, NH-C, C-OCH₃, N(CH₃)₂) | Do. |

TABLE 3

| Example | Diazo component | Coupling component | Shade on polyamide |
|---|---|---|---|
| 15 | 2,4,5-trichloroaniline | (structure with N(CH₃)₂, NH, CH₃O-C, C-N(CH₂CH₂OH)₂) | Orange. |
| 16 | 3,4-dichloroaniline | Same as above | Yellowish orange. |
| 17 | 4-chloroaniline | do | Very strongly yellowish orange. |
| 18 | 4-aminobenzoic acid ethyl ester | do | Reddish orange. |
| 19 | 2-amino-4-phenylthiazole | do | Bluish red. |
| 20 | 4-acetamidoaniline | do | Very strongly yellowish orange. |
| 21 | 4-acetamido-2-chloroaniline | do | Yellowish orange. |
| 22 | 4-acetamido-2,6-dichloroaniline | do | Orange. |
| 23 | 4-amino-3-chlorobenzoic acid ethyl ester | do | Scarlet. |

TABLE 3.—Continued

| Example | Diazo component | Coupling component | Shade on polyamide |
|---|---|---|---|
| 24 | 2-amino-4-cyano-benzonitrile (NC–C₆H₃(CN)–NH₂) | Same as above | Ruby. |
| 25 | 2,4,5-trichloroaniline | phenyl-N(C₂H₅)₂ / NH–C / triazine with CH₃O–C and C–NHCH₂CH₂OH | Orange. |
| 26 | 2,4-dichloroaniline | Same as above | Yellowish orange. |
| 27 | 2-amino-5-phenyl-1,3,4-thiadiazole | ...do... | Bluish red. |
| 28 | 4-acetamidoaniline (CH₃CO–NH–C₆H₄–NH₂) | ...do... | Very strongly yellowish orange. |
| 29 | 4-acetamido-2-chloroaniline | ...do... | Yellowish orange. |
| 30 | 4-acetamido-2,5-dichloroaniline | ...do... | Orange. |
| 31 | ethyl 4-amino-3-chlorobenzoate (C₂H₅OOC–C₆H₃(Cl)–NH₂) | ...do... | Scarlet. |
| 32 | 2-amino-3-cyano-5-cyanobenzene (NC–C₆H₃(CN)–NH₂) | ...do... | Ruby. |
| 33 | 4-chloroaniline (Cl–C₆H₄–NH₂) | phenyl-N(C₂H₅)₂ / NH–C / triazine with CH₃O–C and C–N(CH₂CH₂OH)₂ | Very strongly yellowish orange. |
| 34 | 4-acetamidoaniline | Same as above | Do. |
| 35 | 4-acetamido-2-chloroaniline | ...do... | Yellowish orange. |
| 36 | ethyl 4-amino-3-chlorobenzoate | ...do... | Scarlet. |
| 37 | 2-amino-4-cyanobenzonitrile | ...do... | Ruby. |

TABLE 3.—Continued

| Example | Diazo component | Coupling component | Shade on polyamide |
|---|---|---|---|
| 38 | 2,4,5-trichloroaniline (Cl, Cl, Cl substituents on aniline) | 3-(N,N-diethylamino)phenyl-NH-triazine with CH₃O-C and C-N(CH₃)₂ substituents | Orange. |
| 39 | 2,4-dichloroaniline | Same as above | Yellowish orange. |
| 40 | 4-chloroaniline | ...do... | Very strongly yellowish orange. |
| 41 | 4-(ethoxycarbonyl)aniline (C₂H₅OC(O)-C₆H₄-NH₂) | ...do... | Reddish orange. |
| 42 | 4-acetamidoaniline (CH₃C(O)-NH-C₆H₄-NH₂) | ...do... | Very strongly yellowish orange. |
| 43 | 4-acetamido-2-chloroaniline | ...do... | Yellowish orange. |
| 44 | 4-acetamido-2,5-dichloroaniline | ...do... | Orange. |
| 45 | 4-(ethoxycarbonyl)-2-chloroaniline | ...do... | Scarlet. |
| 46 | 2-amino-1,4-dicyanobenzene | ...do... | Ruby. |
| 47 | 2,4,5-trichloroaniline | 3-(N,N-diethylamino)phenyl-NH-triazine with Cl-C and C-NHCH₂CH₂OH substituents | Orange. |
| 48 | 2,4-dichloroaniline | Same as above | Yellowish orange. |
| 49 | 4-chloroaniline | ...do... | Very strongly yellowish orange. |
| 50 | 4-acetamidoaniline | ...do... | Do. |
| 51 | 4-acetamido-2-chloroaniline | ...do... | Yellowish orange. |
| 52 | 4-acetamido-2,5-dichloroaniline | ...do... | Orange. |

TABLE 3.—Continued

| Example | Diazo component | Coupling component | Shade on polyamide |
|---|---|---|---|
| 53 | 4-amino-3-chloro-benzoic acid ethyl ester (C₂H₅OOC-C₆H₃(Cl)-NH₂) | Same as above | Scarlet. |
| 54 | 2-amino-4-cyano-benzonitrile (NC-C₆H₃(CN)-NH₂) | ...do | Ruby. |
| 55 | 4-chloroaniline (Cl-C₆H₄-NH₂) | phenyl-N(C₂H₅)₂ substituted triazine: NH-C bridged triazine with (CH₃)₂N-C and C-NHCH₂CH₂OH substituents | Very strongly yellowish orange. |
| 56 | CH₃C(O)NH-C₆H₄-NH₂ | Same as above | Do. |
| 57 | CH₃C(O)NH-C₆H₃(Cl)-NH₂ | ...do | Yellowish orange. |
| 58 | CH₃C(O)NH-C₆H₂(Cl)(Cl)-NH₂ | ...do | Orange. |
| 59 | C₂H₅OOC-C₆H₃(Cl)-NH₂ | ...do | Scarlet. |
| 60 | NC-C₆H₃(CN)-NH₂ | ...do | Ruby. |
| 61 | 2,4,5-trichloroaniline (Cl₃C₆H₂-NH₂) | phenyl-N(n-C₃H₇)₂ substituted triazine with NH-C bridge, CH₃O-C and C-N(CH₂CH₂OH)₂ substituents | Orange. |
| 62 | 2,4-dichloroaniline (Cl₂C₆H₃-NH₂) | Same as above | Yellowish orange. |
| 63 | Cl-C₆H₄-NH₂ | ...do | Very strongly yellowish orange. |
| 64 | C₂H₅OOC-C₆H₄-NH₂ | ...do | Reddish orange. |
| 65 | 2-amino-4-phenylthiazole | ...do | Bluish red. |
| 66 | CH₃C(O)NH-C₆H₄-NH₂ | ...do | Very strongly yellowish orange. |
| 7 | CH₃C(O)NH-C₆H₃(Cl)-NH₂ | ...do | Yellowish orange. |

TABLE 3.—Continued

| Example | Diazo component | Coupling component | Shade on polyamide |
|---|---|---|---|
| 68 | 4-amino-2,5-dichloro-acetanilide (CH₃C(O)NH-C₆H₂(Cl)₂-NH₂) | Same as above | Orange. |
| 69 | ethyl 2-chloro-4-aminobenzoate (C₂H₅OC(O)-C₆H₃(Cl)-NH₂) | ...do... | Scarlet. |
| 70 | 2-amino-4-cyanobenzonitrile (NC-C₆H₃(CN)-NH₂) | ...do... | Ruby. |
| 71 | 2,4,5-trichloroaniline (Cl₃C₆H₂-NH₂) | Triazine coupler: 2-methoxy-4-[(3-di-n-butylamino)anilino]-6-bis(2-hydroxyethyl)amino-1,3,5-triazine (CH₃O-C, NH-C₆H₄-N(n-C₄H₉)₂, C-N(CH₂CH₂OH)₂) | Orange. |
| 72 | 2,4-dichloroaniline (Cl₂C₆H₃-NH₂) | Same as above | Yellowish orange. |
| 73 | 4-chloroaniline (Cl-C₆H₄-NH₂) | ...do... | Do. |
| 74 | ethyl 4-aminobenzoate (C₂H₅OC(O)-C₆H₄-NH₂) | ...do... | Reddish orange. |
| 75 | 2-amino-5-phenyl-1,3,4-thiadiazole | ...do... | Bluish red. |
| 76 | 4′-aminoacetanilide (CH₃C(O)NH-C₆H₄-NH₂) | ...do... | Yellowish orange. |
| 77 | 2-chloro-4-acetamidoaniline (CH₃C(O)NH-C₆H₃(Cl)-NH₂) | ...do... | Do. |
| 78 | 4-amino-2,5-dichloroacetanilide (CH₃C(O)NH-C₆H₂(Cl)₂-NH₂) | ...do... | Orange. |
| 79 | ethyl 2-chloro-4-aminobenzoate (C₂H₅OC(O)-C₆H₃(Cl)-NH₂) | ...do... | Scarlet. |
| 80 | 2-amino-4-cyanobenzonitrile (NC-C₆H₃(CN)-NH₂) | ...do... | Ruby. |
| 81 | 2,4,5-trichloroaniline (Cl₃C₆H₂-NH₂) | Triazine coupler: with N(C₂H₅)(CH₂CH₂OH) aniline, NH, (CH₃)₂N-C and C-NHCH₂CH₂OH on triazine | Orange. |

TABLE 3—Continued

| Example | Diazo component | Coupling component | Shade on polyamide |
|---|---|---|---|
| 82 | 2,4-dichloroaniline | Same as above | Yellowish orange. |
| 83 | 4-chloroaniline | do | Do. |
| 84 | ethyl 4-aminobenzoate | do | Reddish orange. |
| 85 | 2-amino-5-phenyl-1,3,4-thiadiazole | do | Bluish red. |
| 86 | 4-acetamidoaniline | do | Yellowish orange. |
| 87 | 4-acetamido-2-chloroaniline | do | Do. |
| 88 | 4-acetamido-2,6-dichloroaniline | do | Orange. |
| 89 | ethyl 4-amino-3-chlorobenzoate | do | Scarlet. |
| 90 | 2-amino-5-cyanobenzonitrile | do | Bluish red. |
| 91 | 2,4,5-trichloroaniline | 2-[(3-bis(2-hydroxyethyl)aminophenyl)amino]-4,6-bis(dimethylamino)-1,3,5-triazine | Orange. |
| 92 | 2,4-dichloroaniline | Same as above | Yellowish orange. |
| 93 | 4-chloroaniline | do | Do. |
| 94 | ethyl 4-aminobenzoate | do | Reddish orange. |
| 95 | 2-amino-5-phenyl-1,3,4-thiadiazole | do | Bluish red. |
| 96 | 4-acetamidoaniline | do | Yellowish orange. |
| 97 | 4-acetamido-2-chloroaniline | do | Do. |
| 98 | 4-acetamido-2,6-dichloroaniline | do | Orange. |

TABLE 3—Continued
| Example | Diazo component | Coupling component | Shade on polyamide |
|---|---|---|---|
| 99 | 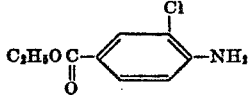 | Same as above | Scarlet. |
| 100 | 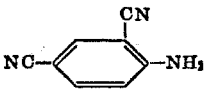 | ......do...... | Bluish red. |
| 101 | 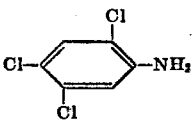 | 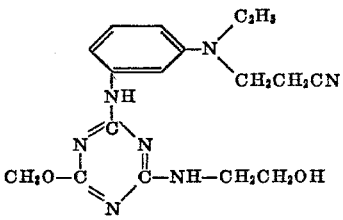 | Orange. |
| 102 | 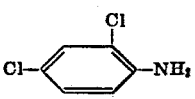 | Same as above | Yellowish orange. |
| 103 | 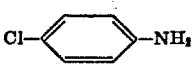 | ......do...... | Do. |
| 104 | 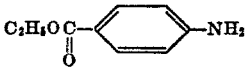 | ......do...... | Orange. |
| 105 | 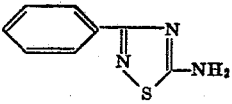 | ......do...... | Bluish red. |
| 106 | 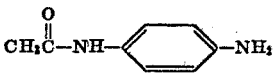 | ......do...... | Yellowish orange. |
| 107 | 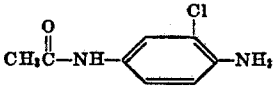 | ......do...... | Do. |
| 108 | 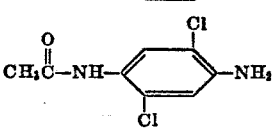 | ......do...... | Orange. |
| 109 | 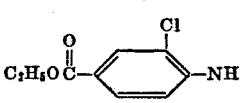 | ......do...... | Scarlet. |
| 110 | 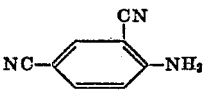 | ......do...... | Bluish red. |
| 111 | 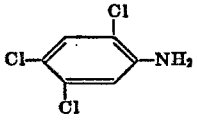 | 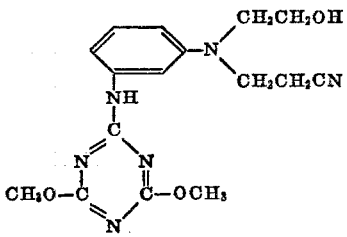 | Orange. |
| 112 | 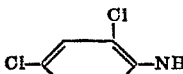 | Same as above | Yellowish orange. |
| 113 | 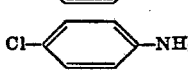 | ......do...... | Do. |
| 114 | 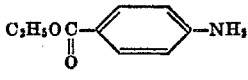 | ......do...... | Reddish orange. |

TABLE 3—Continued

| Example | Diazo component | Coupling component | Shade on polyamide |
|---|---|---|---|
| 115 | 2-amino-5-phenyl-1,3,4-thiadiazole | Same as above | Bluish red. |
| 116 | CH₃C(O)NH–C₆H₄–NH₂ | ...do | Yellowish orange. |
| 117 | CH₃C(O)NH–C₆H₃(Cl)–NH₂ | ...do | Do. |
| 118 | CH₃C(O)NH–C₆H₂(Cl)₂–NH₂ | ...do | Orange. |
| 119 | C₂H₅OC(O)–C₆H₃(Cl)–NH₂ | ...do | Scarlet. |
| 120 | NC–C₆H₃(CN)–NH₂ | ...do | Bluish red. |
| 121 | 2,4,5-trichloroaniline | coupling component (triazine with N(C₂H₅)(CH₂CH₂COOCH₃), NHCH₂CH₂OH, OCH₃ substituents) | Orange. |
| 122 | 3,4-dichloroaniline | Same as above | Yellowish orange. |
| 123 | 4-chloroaniline | ...do | Do. |
| 124 | C₂H₅OC(O)–C₆H₄–NH₂ | ...do | Reddish orange. |
| 125 | 2-amino-5-phenyl-1,3,4-thiadiazole | ...do | Bluish red. |
| 126 | CH₃C(O)NH–C₆H₄–NH₂ | ...do | Yellowish orange. |
| 127 | CH₃C(O)NH–C₆H₃(Cl)–NH₂ | ...do | Do. |
| 128 | CH₃C(O)NH–C₆H₂(Cl)₂–NH₂ | ...do | Orange. |
| 129 | C₂H₅OC(O)–C₆H₃(Cl)–NH₂ | ...do | Scarlet. |
| 130 | NC–C₆H₃(CN)–NH₂ | ...do | Bluish red. |

TABLE 3—Continued

| Example | Diazo component | Coupling component | Shade on polyamide |
|---|---|---|---|
| 131 | 2,4,5-trichloroaniline | 3-[N-ethyl-N-(2-acetoxyethyl)amino]phenyl-NH-C(=N)(N=)C-OCH₃, C-N(CH₂CH₂OH)₂ triazine | Orange. |
| 132 | 2,6-dichloroaniline | Same as above | Yellowish orange. |
| 133 | 4-chloroaniline | ...do... | Do. |
| 134 | ethyl 4-aminobenzoate | ...do... | Reddish orange. |
| 135 | 2-amino-4-phenylthiazole | ...do... | Bluish red. |
| 136 | 4-acetamidoaniline | ...do... | Yellowish orange. |
| 137 | 4-acetamido-2-chloroaniline | ...do... | Do. |
| 138 | 4-acetamido-2,5-dichloroaniline | ...do... | Orange. |
| 139 | ethyl 3-chloro-4-aminobenzoate | ...do... | Scarlet. |
| 140 | 2-amino-5-cyanobenzonitrile | ...do... | Bluish red. |
| 141 | 2,4,5-trichloroaniline | 3-[N-ethyl-N-(2-hydroxyethoxyethyl)amino]phenyl-NH-triazine-OCH₃, -NHCH₂CH₂OH | Orange. |
| 142 | 2,6-dichloroaniline | Same as above | Yellowish orange. |
| 143 | 4-chloroaniline | ...do... | Do. |
| 144 | ethyl 4-aminobenzoate | ...do... | Reddish orange. |
| 145 | 2-amino-4-phenylthiazole | ...do... | Bluish red. |
| 146 | 4-acetamidoaniline | ...do... | Yellowish orange. |

TABLE 4—Continued

| Example | Diazo component | Coupling component | Shade on polyamide |
|---|---|---|---|
| 147 | 4-(CH$_3$C(O)NH)-2-Cl-aniline (CH$_3$C(O)NH–C$_6$H$_3$(Cl)–NH$_2$) | Same as above | Yellowish orange. |
| 148 | CH$_3$C(O)NH–C$_6$H$_2$(Cl)(Cl)–NH$_2$ (2,5-dichloro) | do | Orange. |
| 149 | C$_2$H$_5$OC(O)–C$_6$H$_3$(Cl)–NH$_2$ | do | Scarlet. |
| 150 | 2-amino-benzonitrile with NC group (NC–C$_6$H$_3$(CN)–NH$_2$) | do | Bluish red. |
| 151 | 2,4,5-trichloroaniline (Cl$_3$C$_6$H$_2$–NH$_2$) | Coupling component: phenyl–N(C$_2$H$_5$)(CH$_2$CH$_2$OCOCH$_3$) linked via NH to triazine with CH$_3$O–C and C–(CH$_2$CH$_2$OH)$_2$ substituents | Orange. |
| 152 | 2,3-dichloroaniline (Cl,Cl–C$_6$H$_3$–NH$_2$) | Same as above | Yellowish orange. |
| 153 | Cl–C$_6$H$_4$–NH$_2$ | do | Do. |
| 154 | C$_2$H$_5$OC(O)–C$_6$H$_4$–NH$_2$ | do | Reddish orange. |
| 155 | 2-amino-4-phenylthiazole | do | Bluish red. |
| 156 | CH$_3$C(O)NH–C$_6$H$_4$–NH$_2$ | do | Yellowish orange. |
| 157 | CH$_3$C(O)NH–C$_6$H$_3$(Cl)–NH$_2$ | do | Do. |
| 158 | CH$_3$C(O)NH–C$_6$H$_2$(Cl)(Cl)–NH$_2$ | do | Orange. |
| 159 | C$_2$H$_5$OC(O)–C$_6$H$_3$(Cl)–NH$_2$ | do | Scarlet. |
| 160 | NC–C$_6$H$_3$(CN)–NH$_2$ | do | Bluish red. |
| 161 | 2,4,5-trichloroaniline (Cl$_3$C$_6$H$_2$–NH$_2$) | Coupling component: phenyl–N(CH$_2$CH$_2$OCCH$_3$)$_2$ linked via NH to triazine with CH$_3$O–C and C–NHCH$_2$CH$_2$OH substituents | Orange. |

TABLE 3—Continued

| Example | Diazo component | Coupling component | Shade on polyamide |
|---|---|---|---|
| 162 | Cl, Cl-phenyl | Same as above | Yellowish orange. |
| 163 | Cl-phenyl-NH₂ | ....do.... | Do. |
| 164 | C₂H₅OC(O)-phenyl-NH₂ | ....do.... | Reddish orange. |
| 165 | phenyl-thiazolyl-NH₂ | ....do.... | Bluish red. |
| 166 | CH₃C(O)-NH-phenyl-NH₂ | ....do.... | Yellowish orange. |
| 167 | CH₃C(O)-NH-phenyl(Cl)-NH₂ | ....do.... | Do. |
| 168 | CH₃C(O)-NH-phenyl(Cl,Cl)-NH₂ | ....do.... | Orange. |
| 169 | C₂H₅OC(O)-phenyl(Cl)-NH₂ | ....do.... | Scarlet. |
| 170 | NC-phenyl(CN)-NH₂ | ....do.... | Bluish red. |

We claim:
1. Monoazo dyestuffs which are free from sulphonic acid groups and correspond to the formula

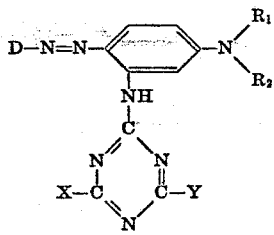

wherein D is selected from the group consisting of phenyl, phenyl-containing 1-3 substituents selected from the group consisting of chloro, methyl, ethyl, nitro, cyano, carboxy, carboxy ethyl ester, carbonamide, dimethylcarbonamide, acetylamino, trifluoromethyl, methoxy, methylsulfonyl and ethylsulfonyl, or a heterocyclic radical selected from the group consisting of thiazolyl, nitrothiazolyl, benzothiazolyl, ethoxybenzothiazolyl, phenylthiadiazolyl, pyridinyl, quinolinyl, indazolyl, and triazolyl; $R_1$ and $R_2$ represent identical or different alkyl radicals containing 1 to 4 carbon atoms or alkylene radicals containing 1-4 carbon atoms and a substituent selected from the group consisting of hydroxy, cyano, acetyloxy, methoxy, hydroxyethoxy, methoxycarbonyloxy, and carbmethoxy; X stands for chlorine, alkoxy with 1-4 carbon atoms, alkoxy with 1-4 carbon atoms and methoxy substituent, or for

wherein $R_3$ and $R_4$ are selected from the group consisting of hydrogen, alkyl with 1-4 carbon atoms, or hydroxy alkyl with 1-4 carbon atoms; Y stands for alkoxy with 1-4 carbon atoms, alkoxy with 1-4 carbon atoms and methoxy substituent, or for

as defined above.

2. Monoazo dyestuff of claim 1 which correspond to the formula

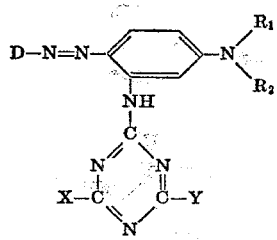

wherein D is selected from the group consisting of phenyl, phenyl-containing 1-3 substituents selected from the group consisting of chloro, methyl, ethyl, nitro, cyano, carboxy, carboxy ethyl ester, carbonamide, dimethylcarbonamide, acetylamino, trifluoromethyl, methoxy, methylsulfonyl and ethylsulfonyl; $R_1$ and $R_2$ represent identical or different alkyl radicals containing 1 to 4 carbon atoms or alkylene radicals containing 1-4 carbon atoms and a substituent selected from the group consisting of hydroxy, cyano, acetyloxy, methoxy, hydroxyethoxy, methoxycarbonyloxy, and carbmethoxy, X stands for chlorine, alkoxy with 1-4 carbon atoms, alkoxy with 1-4 carbon atoms and methoxy substituent, or for

wherein $R_3$ and $R_4$ are selected from the group consisting of hydrogen, alkyl with 1–4 carbon atoms, or hydroxy alkyl with 1–4 carbon atoms; Y stands for alkoxy with 1–4 carbon atoms, alkoxy with 1–4 carbon atoms and methoxy substituent, or for

as defined above.

References Cited
UNITED STATES PATENTS
3,135,731   6/1964   Tilley et al. _____ 260—153

JOSEPH REBOLD, Primary Examiner
D. M. PAPUGA, Assistant Examiner

U.S. Cl. X.R.
260—249.5, 249.6, 249.8